United States Patent [19]

Yoneda et al.

[11] Patent Number: 5,366,834
[45] Date of Patent: Nov. 22, 1994

[54] METHOD OF MANUFACTURING A CATHODE RAY TUBE PHOSPHOR SCREEN

[75] Inventors: Masahiro Yoneda; Shoichi Bando; Ichiro Takeoka, all of Anan, Japan

[73] Assignee: Nichia Kagaku Kogyo K.K., Tokushima, Japan

[21] Appl. No.: 56,934

[22] Filed: May 5, 1993

Related U.S. Application Data

[63] Continuation-in-part of Ser. No. 591, Jan. 5, 1993, abandoned, which is a continuation of Ser. No. 610,956, Nov. 9, 1990, abandoned.

[30] Foreign Application Priority Data

Nov. 15, 1989 [JP] Japan .................. 1-298684
Nov. 15, 1989 [JP] Japan .................. 1-298685

[51] Int. Cl.⁵ .............................................. G03C 5/00
[52] U.S. Cl. .................................... 430/23; 430/25; 430/26; 430/27; 430/28
[58] Field of Search ............... 430/23, 25, 26, 27, 430/28

[56] References Cited

U.S. PATENT DOCUMENTS

| | | | |
|---|---|---|---|
| 3,264,133 | 8/1966 | Brooks | 428/917 X |
| 3,408,233 | 10/1968 | Shortes | 427/214 |
| 3,537,876 | 11/1970 | Shortes | 428/403 |
| 4,049,845 | 9/1977 | Lozier et al. | 428/403 |
| 4,287,229 | 9/1981 | Watanabe et al. | 428/404 |
| 4,407,916 | 10/1983 | Akagi et al. | 430/28 |
| 4,473,634 | 9/1984 | Dodds et al. | 430/271 |
| 4,544,605 | 10/1985 | Miyazaki et al. | 428/403 |
| 4,855,189 | 8/1989 | Simopoulos et al. | 428/690 |
| 4,917,978 | 4/1990 | Ritt et al. | 430/23 |
| 4,975,619 | 12/1990 | Datta et al. | 313/467 |
| 5,002,844 | 3/1991 | Cheong et al. | 430/26 |
| 5,134,047 | 7/1992 | Inada et al. | 430/23 |
| 5,185,207 | 2/1993 | Furuoka et al. | 428/424 |
| 5,290,648 | 3/1994 | Kim et al. | 430/23 |

FOREIGN PATENT DOCUMENTS

| | | |
|---|---|---|
| 106967 | 5/1984 | European Pat. Off. . |
| 45016091 | 6/1966 | Japan . |
| 60-119055 | 6/1985 | Japan . |
| 63-42371 | 8/1988 | Japan . |
| 63-207888 | 8/1988 | Japan . |
| 0512999 | 11/1974 | U.S.S.R. ............. 313/467 |

*Primary Examiner*—Hoa Van Le
*Attorney, Agent, or Firm*—Nixon & Vanderhye

[57] ABSTRACT

In a cathode-ray tube phosphor, a layer consisting of a substantially uniform $SiO_2$ film or an organic film consisting essentially of at least one type of a polymer selected from the group consisting of an acrylic resin, gelatin, alginic acid, chitosan, and a urea resin is formed as a first layer on the surface of a phosphor particle, and a layer containing at least one type of a metal selected from the group consisting of Zn, Al, and an alkali earth metal and at least one member selected from the group consisting of a colloidal silica, an alumina sol, and a titania sol each having a particle size of 50 nm or less is formed as a second layer on the first layer. This phosphor is excellent in oxidation resistance and dispersibility.

16 Claims, 7 Drawing Sheets

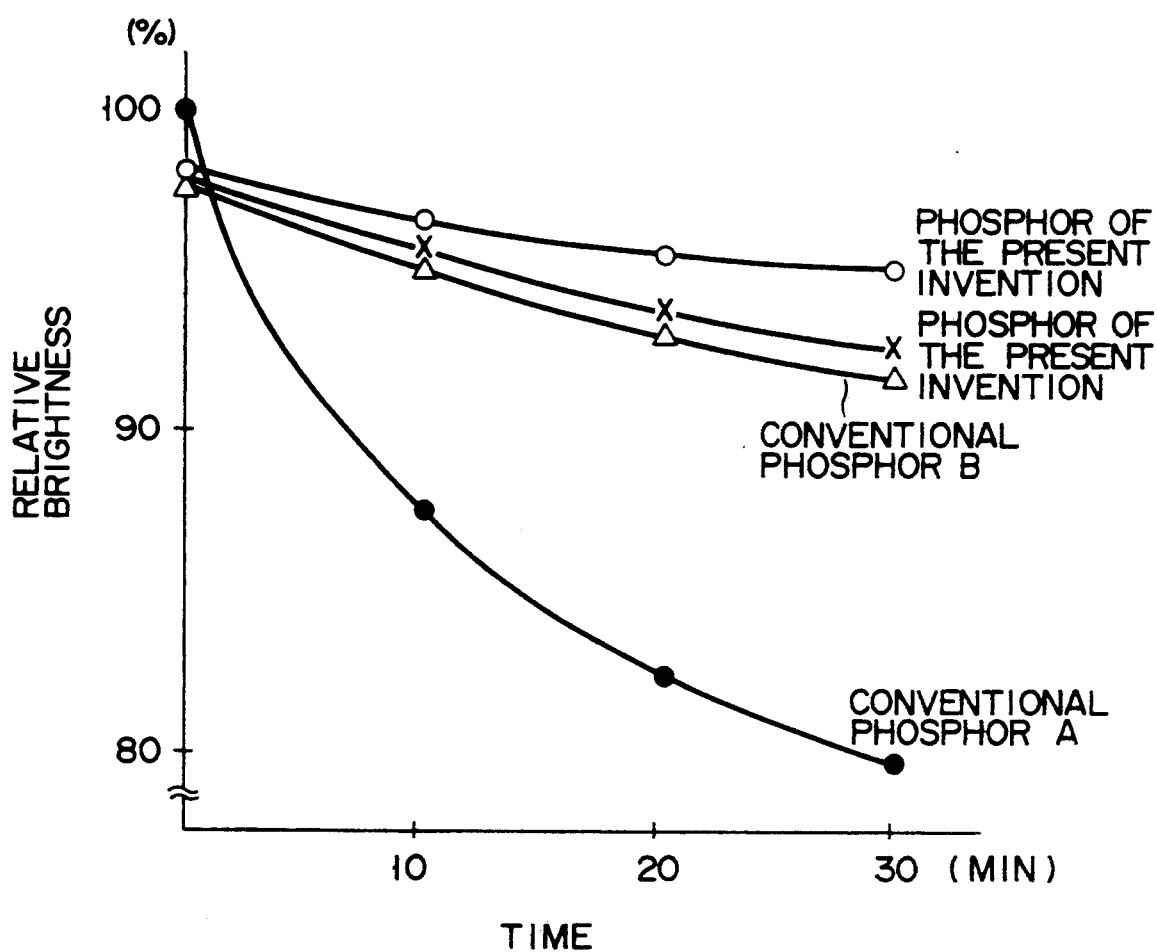
F I G. 2

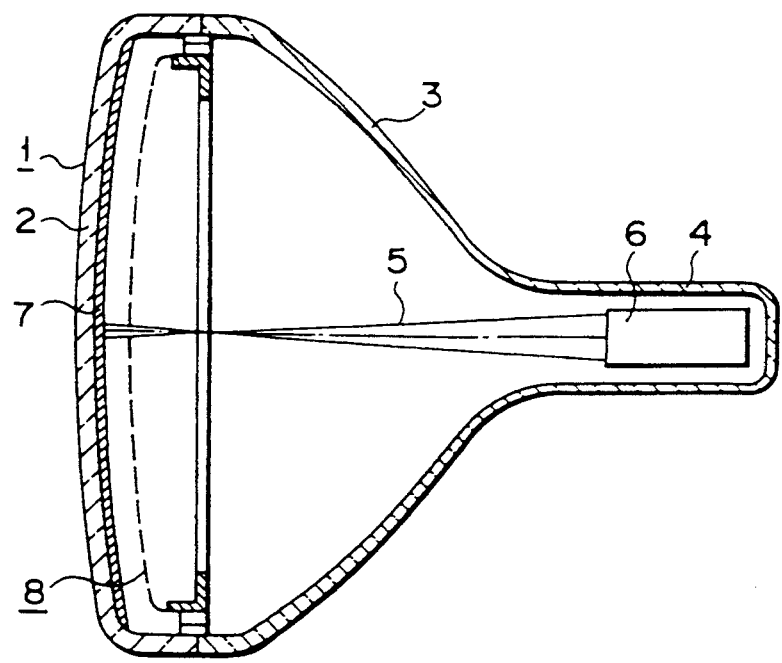
F I G. 5

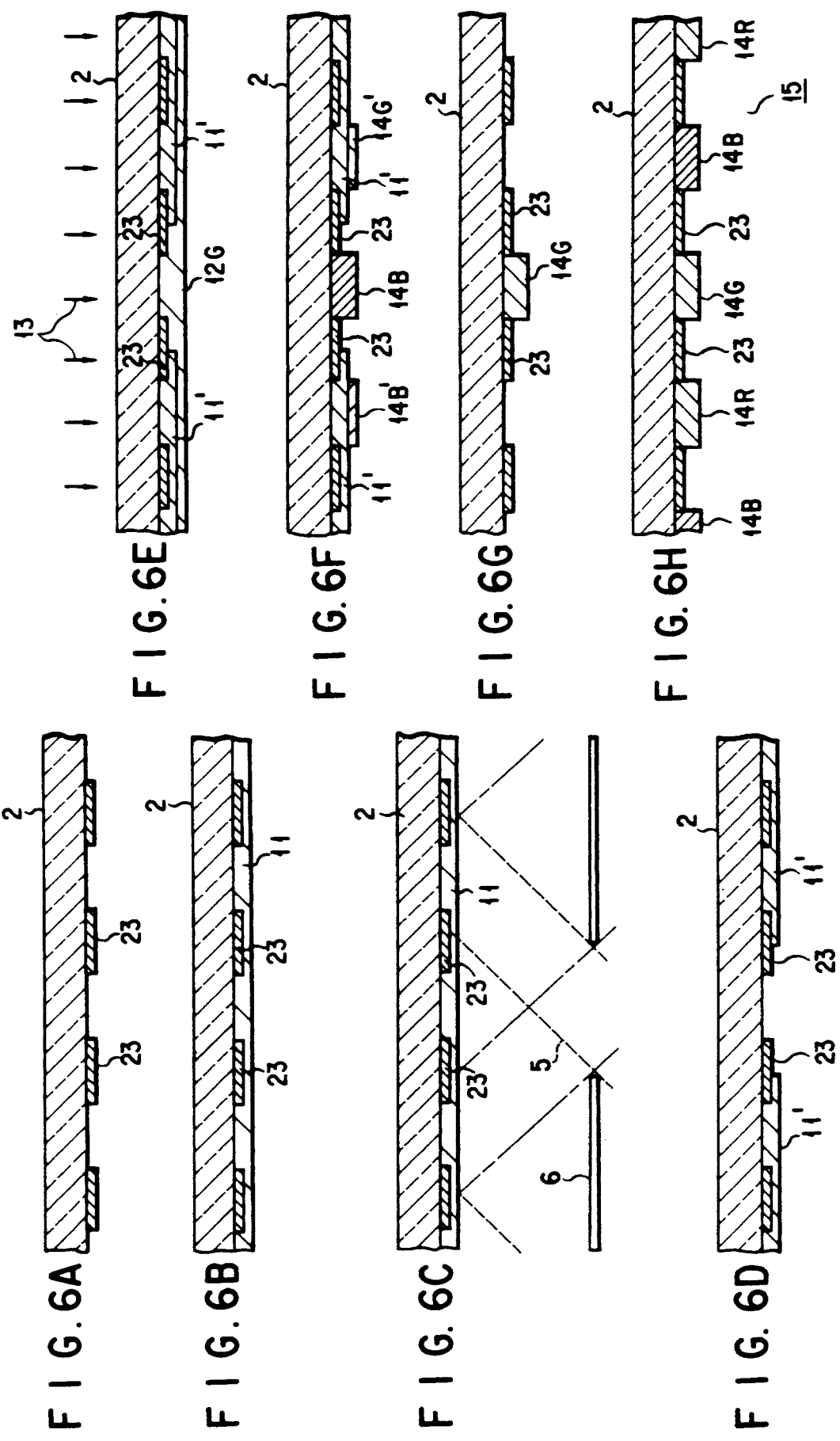

METHOD OF MANUFACTURING A CATHODE RAY TUBE PHOSPHOR SCREEN

This is a continuation-in-part of application Ser. No. 08/000,591, filed Jan. 5, 1993, now abandoned, which is a continuation of U.S. Ser. No. 07/610,956, filed Nov. 9, 1990, now abandoned.

BACKGROUND OF THE INVENTION

1. Field of the Invention

The present invention relates to a cathode-ray tube phosphor and, more particularly, to a color cathode-ray tube phosphor suitably used to form a phosphor screen on a faceplate of a cathode-ray tube by an outer surface exposure method.

2. Description of the Related Art

Cathode-ray tube phosphors are generally coated on the inner surface of a faceplate in a cathode-ray tube.

FIG. 5 shows one embodiment of a cathode-ray tube. As is shown in FIG. 5, a vacuum envelope 1 made of glass is arranged such that a faceplate 2 is integrally connected to a funnel 3. The funnel 3 is provided with a neck portion 4. An electron gun 6 for emitting and focusing electron beams 5 is arranged within the neck 4. A phorphor screen 7 is formed on the inner surface of the faceplate 2 of the envelope 1, such that the phosphor screen 7 opposes to the electron gun 6. A shadow mask structure 8 is arranged on the inside of the phosphor screen 7.

As a conventional exposure method of forming a phosphor screen 7 of a so-called black matrix type color cathode-ray tube, a method of exposing a coating layer, which is formed on tinner surface of a faceplate 2 and on which a phosphor slurry containing a photosensitive substance and a phosphor, through a shadow mask 8 by using a light source arranged at the position of an electron gun 6 of a cathode-ray tube is available. In this conventional method, however, when a photopolymerization reaction progresses from the surface of the coating film exposed in accordance with an exposure time and an exposure intensity toward the inner surface of the faceplate, unsatisfactory adhesion strength between the phosphor film and the faceplate inner surface and errors in the shape and position of the phosphor film are caused due to refraction of radiated light, an error in an exposure position, nonuniformity in film thickness and the like. Therefore, it is difficult to form a phosphor film having a predetermine shape, a high resolution, a sharp edge, and a high density in a predetermined position of the faceplate inner surface.

In recent years, however, Published Unexamined Japanese Patent Application No. 60-119055 or Published Examined Japanese Patent Application No. 63-42371 discloses an outer surface exposure method in which a first photosensitive agent layer is selectively formed on a portion of the inner surface of a faceplate except for a portion on which a phosphor layer is to be formed, a phosphor slurry containing a second photosensitive agent which cannot be removed by a reverse developing agent of the first photosensitive layer is coated, exposure is performed from the outer surface of the faceplate, and development is performed by the reverse developing agent of this resist layer after exposure, thereby removing the first photosensitive agent layer and the phosphor slurry at a portion except for the portion on which a phosphor layer is to be formed.

In this outer surface exposure method, a polyvinyl alcohol (PVA)-ammonium dichromate (ADC)-based photosensitive agent and a PVA-stilbazolium (SBQ)-based photosensitive agent are often used as the first and second photosensitive agents, respectively. In addition, hydrogen peroxide is often used as the reverse developing agent of the first photosensitive agent.

According to this method, in a step of forming a phosphor film of one color, reverse development must be performed once by using hydrogen peroxide. Therefore, this development is performed three times in order to form a phosphor screen consisting of phosphor films of three colors. For this reason, a phosphor film formed first is subjected to reverse development twice in two subsequent phosphor film formation steps.

This hydrogen peroxide oxidizes the surfaces of ZnS, $Y_2O_2S$, and the like as phosphor components to produce $H_2SO_4$ and $H_2S$, thereby reducing brightness of each film.

In addition, hydrogen peroxide causes denaturing of the second photosensitive agent PVA-SBQ to deteriorate its function as a photosensitive agent. For this reason, phenomena such as omission of phosphor dots and stripes occur.

It is found by later studies for further improvements that the second photosensitive agent can be prevented from being deteriorated by mixing a vinyl acetate emulsion as a protective colloid and oxyethylenedodecylamine, for example, as a cationic surfactant in the photosensitive agent. In addition, in order to prevent brightness reduction caused by oxidation of the phosphor surface, Published Unexamined Japanese Patent Application No. 63-207888 discloses a method in which an acrylic resin, an acrylic monomer, polystyrene, or the like is coated on the surface of a phosphor particle to improve an oxidation resistance, and a silica treatment is performed on this coating layer in accordance with a conventional method. Although the obtained phosphor has a satisfactory oxidation resistance, it cannot be satisfactorily dispersed in the cationic surfactant described above. Therefore, a good phosphor screen cannot be formed by using this phosphor.

SUMMARY OF THE INVENTION

It is an object of the present invention to improve a method for manufacturing a phosphor screen by using an outer surface exposure method and, more particularly, a method using a phosphor having a high oxidation resistance and good dispersibility even in a cationic surfactant.

One embodiment of the present invention provides a method of manufacturing a cathode ray tube phosphor screen, including the steps of:

selectively forming a first photosensitive layer on the inner surface of a faceplate except the region in which a phosphor layer is to be formed, this photosensitive layer being removable with a reverse developing agent;

coating the inner surface of the faceplate with a phosphor slurry containing a second photosensitive agent which cannot be removed by the reverse developing agent later used to remove the first photosensitive layer;

exposing the inner surface of the faceplate to light emitted from outside and running through the faceplate, and forming a phosphor layer in a region in which a phosphor layer is to be formed on the faceplate and on the first photosensitive layer; and thereafter developing the phosphor layer using a reverse developing agent to remove the first photosensitive layer and the phosphor layer formed on it.

The process is further characterized by using specifically prepared phosphor particles having formed on the surface of each particles a first layer of phosphor particles in an amount of 0.1 to 5.0% by weight based on the weight of the phosphor particles, and consisting of a substantially uniform silicon dioxide film. Over this first layer is formed a second layer in an amount of 0.008 to 1.5% by weight based on the weight of the phosphor particles, the second layer containing at least one metal selected from zinc and aluminum, and an alkali earth metal and at least one member selected from a colloidal silica, an alumina sol, and a titania sol each having a particle size of 50 nm or less.

Another embodiment of the present invention provides a method of manufacturing a cathode ray tube phosphor screen, comprising the steps of:

selectively forming a first photosensitive layer on the inner surface of a faceplate except the region in which the phosphor layer is to be formed, this photosensitive layer being removable with a reverse developing agent;

coating the inner surface of the faceplate with a phosphor slurry containing a second photosensitive agent which cannot be removed by the reverse developing agent later used to remove the first photosensitive layer;

exposing the inner surface of the faceplate to light emitted from outside and running through the faceplate, and forming a phosphor layer in a region in which a phosphor layer is to be formed on the faceplate and on the first photosensitive layer; and thereafter developing the phosphor layer using the reverse developing agent for the first photosensitive layer to remove the first photosensitive layer and the phosphor layer formed on it.

The process is further characterized by the use of specifically prepared phosphor particles having formed on the surface of each particle a first layer in an amount of 0.5 to 0.5% by weight based on the weight of the phosphor particles, and consisting essentially of at least on polymer selected from an acrylic resin, gelatin, alginic acid, chitosan, and a urea resin; and a second layer in an amount of 0.008 to 1.5% by weight based on the weight of the phosphor particles, formed on the first layer and containing at least one metal selected from zinc and aluminum, and an alkali earth metal and at least one member selected from the group consisting of a colloidal silica, an alumina sol, and a titania sol each having a particle size of 50 nm or less.

A cathode-ray tube phosphor used in the present invention comprises:

phosphor particles;

a frist layer formed on a surface of each of the phosphor particles and consisting of a substantially uniform $SiO_2$ film; and a second layer formed on the first layer and containing at least one type of a metal selected from the group consisting of Zn, Al, and an alkali earth metal and at least one member selected from the group consisting of a colloidal silica, an alumina sol, and a titania sol each having a particle size of 50 nm.

In addition, a cathode-ray tube phosphor used in the present invention comprises:

phosphor particles;

a first layer formed on a surface of each of the phosphor particles and essentially consisting of at least one type of a polymer selected from the group consisting of an acrylic resin, gelatin, alginic acid, chitosan, and a urea resin; and a second layer formed on the first layer and containing at least one type of a metal selected from the group consisting of Zn, Al, and an alkali earth metal and at least one member selected from the group consisting of a colloidal silica, an alumina sol, and a titania sol each having a particle size of 50 nm.

In the cathode-ray tube phosphor according to the present invention, an excellent oxidation-resistant layer can be obtained by forming the first layer, and good dispersibility can be obtained even in a cationic surfactant by forming the second layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a graph showing brightness deterioration of a phosphor of the present invention caused by hydrogen peroxide;

FIG. 5 is a schematic view showing the structure of a conventional cathode-ray tube; and FIGS. 6A to 6H are schematic views illustrating the method of the present invention.

DETAILED DESCRIPTION OF THE PREFERRED EMBODIMENTS

Figure 1A:
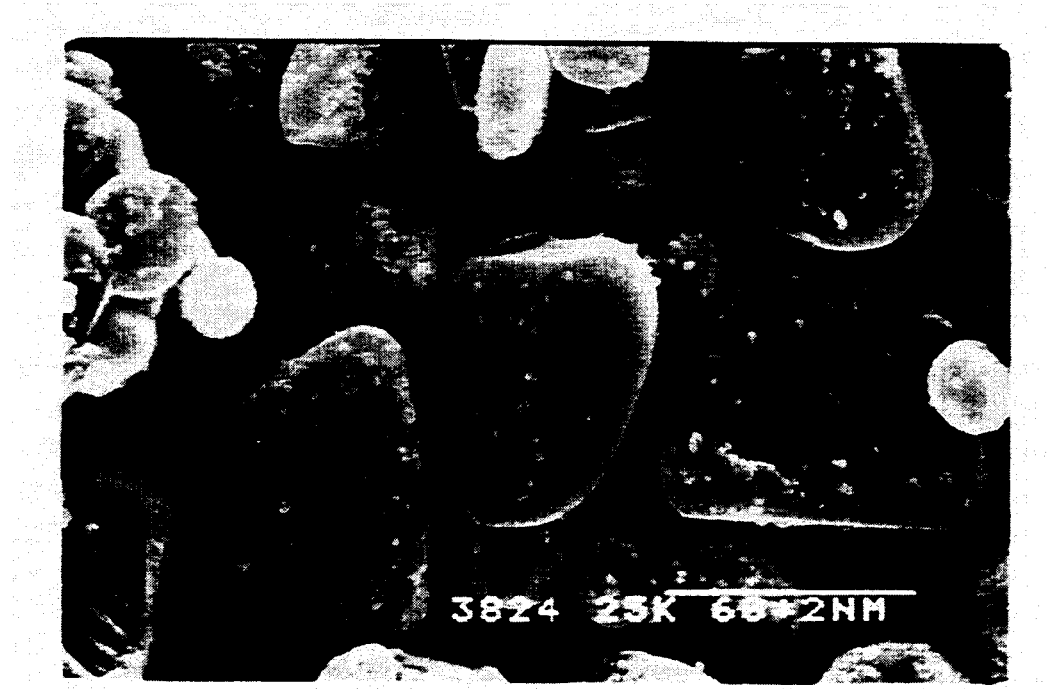
FIG. 1A is a photograph showing a structure of the surface of a particle of a conventional oxidationresistant phosphor.

The present invention provides a method of manufacturing a phosphor screen of a cathode-ray tube by an outer surface exposure method. FIGS. 6A to 6H show the steps of the method of the prevent invention. As shown in FIG. 6A, a black stripe 23 of carbon is formed on an inner surface of a faceplate 2, followed by coating the inner surface with a layer of first photosensitive agent 11, as shown in FIG. 6B.

In the next step, the coated layer 11 is selectively exposed to light except the region in which a phosphor layer is to be formed later, as shown in FIG. 6C. The non-exposed region is removed by, for example, washing with water, to form selectively a cured layer 11' of the first photosensitive agent, as shown in FIG. 6D.

Next, the inner surface of the faceplate 2 having the cured layer 11' formed on it is coated with phosphor slurry 12G containing a second photosensitive agent and a phosphor, as shown in FIG. 6E. In this case, a green light emitting phosphor is used as the phosphor. It is important to use a second photosensitive agent which is not reversed by a reversing agent for the first photosensitive agent. If the second photosensitive agent can be reversed by the reversing agent used for the first photosensitive agent, the second photosensitive layer containing the phosphor peels off the faceplate, resulting in failure to form a phosphor screen.

The phosphor slurry 12G containing the second photosensitive agent is exposed to light through the faceplate 2, as shown in FIG. 6E. After the exposure, the second photosensitive layer is developed by, for example, washing with water. In the exposing step, the light passing through the faceplate 2 is selectively intercepted by the black stripe 23. The second photosensitive layer in the light-intercepted region is removed by the water-wash, thereby selectively forming a phosphos layer on the region cured by the light exposure, i.e., a region 14G in direct contact with the faceplate and a region 14G' formed on the cured first photosensitive layer 11', as shown in FIG. 6F.

Next, the inner surface of the faceplate is dipped in a reversing agent for the cured first photosensitive layer 11' to develop it, thereby dissolving the cured first photosensitive layer 11' and removing it together with the phosphor region 14', as shown in FIG. 6G. It should be noted that the cured second photosensitive layer 14G is not dissolved in the reversing agent, but remains on that region of the faceplate at which a green light emitting phosphor layer is to be formed. Thereafter, in sequence, a red light emitting phosphor layer 14R and a blue light emitting layer 14B may be formed in the same manner, except for using red and blue light emitting phosphors, respectively, to obtain a phorphor screen as shown in FIG. 6H.

The outer surface exposure method explained above makes it possible to form a fine phosphor film pattern of high density and high sharpness in a predetermined position on the inner surface of a faceplate. In the outer surface exposure method, photosensitive agents containing stylbazorium groups are used, in general, as the first and second photosensitive agents, respectively. Also, an oxidizing agent such as hydrogen peroxide is used as a reversing agent which permits selectively reversal of only the first photosensitive agent. Since photosensitive agents containing stylbazorium groups tend to be somewhat weakened by the oxidizing agent, it is possible to add a protective colloid, e.g., vinyl acetate emulsion and a cationic surfactant, to the phosphor slurry containing the second photosensitive agent.

In the conventional manufacturing technique, however, the brightness of the phosphor used is decreased by the oxidizing function of the reversing agent. Also, the phosphor is not sufficiently dispersed in the cationic surfactant. The present invention overcomes these problems because the two specified coating layers are formed on the phosphor.

The present inventors conducted experiments by adhering various types of resins and inorganic substances on the surface of a cathode-ray tube phosphor and found that a phosphor having an oxidation resistance and dispersibility suited to an outer surface exposure method can be obtained by forming a film having a high oxidation resistance on a first layer and then coating a substance for imparting good dispersibility in a cationic surfactant on a second layer, thereby achieving the present invention.

In a phosphor which can be used in the present invention, a substantially uniform $SiO_2$ film is formed as a first layer on the surface of a phosphor particle, and a second layer containing at least one type of a metal selected from the group consisting of Zn, Al, and an alkali earth metal and at least one member selected from the group consisting of a colloidal silica, an alumina sol, and a titania sol each having a particle size of 50 nm or less is formed on the first layer.

Such a phosphor can be manufactured by the following method.

First, phosphor particles are suspended in a solution mixture of alcohol and ammonia water, and the resultant suspension is held at a temperature of 40° C. to 60° C. Subsequently, an alkyl silicate and ammonia water are simultaneously dropped to keep a pH of the suspension at around 9.2. Thereafter, the phosphor is washed with water and separated. The separated phosphor is dried or sintered at a temperature of about 100° C. to 500° C. to obtain a first layer consisting of a substantially uniform $SiO_2$ film.

The phosphor having the first layer thereon is dispersed in water, a water-soluble metal compound containing at least one type of an element selected from the group consisting of Zn, Al, and an alkali metal and at least one member selected from the group consisting of a colloidal silica, an alumina sol, and a titania sol each of which is commercially available and has a particle size of 50 nm or less are added to prepare a suspension, and a pH is adjusted to be 6.5 to 11. The prepared suspension is left to stand at room temperature, and the phosphor is washed with water and separated. The separated phosphor is dried at 110° C. to 200° C. to obtain the phosphor having a second layer thereon containing ions of the metal and the colloidal silica, the alumina sol, or the titania sol described above.

Preferable examples of the alkyl silicate used in formation of the first layer are methyl silicate, ethyl silicate, and propyl silicate. In addition to the method using a hydrolytic reaction of an alkyl silicate as described above, the first layer may be formed by a method in which phosphor particles are dipped in a coating solution prepared by dissolving silica in an alkali solution of choline and the resultant solution is evaporated and dried to form an $SiO_2$ film.

A coating amount of the first layer is preferably 0.1 to 5.0 wt %, and more preferably, 0.5 to 1.5 wt % with respect to a phosphor amount. If the coating amount is less than 0.1 wt %, a satisfactory oxidation resistance tends to be unable to be obtained. If the coating amount exceeds 5.0 wt %, the thickness of the silica layer tends to be increased to reduce brightness of the phosphor.

In addition, according to the present invention, and organic film consisting essentially of at least one type of a polymer selected from the group consisting of an acrylic resin, gelatin, alginic acid, chitosan, and a urea resin can be applied as the first layer having an oxidation resistance.

This organic film can be formed as follows.

First, phosphor particles are dispersed in water. Subsequently, an emulsion as a material of an organic film is added to the phosphor dispersion solution, and a suitable coagulant such as ions of an alkali metal or an alkali earth metal are added to adjust a pH of the resultant solution to be a predetermined value, thereby coagulating the organic film material on the surface of the phosphor. Thereafter, the phosphor is separated and dried to form an organic film consisting essentially of at least one type of a polymer selected from the group consisting of an acrylic resin, gelatin, alginic acid, chitosan, and a urea resin on the phosphor surface.

In order to obtain the phosphor of the present invention, the second layer may be formed on this organic film as described above.

A coating amount of the first layer consisting essentially of the above organic film is preferably 0.05 to 0.5 wt %, and more preferably, 0.1 to 0.3 wt % with respect to the phosphor amount. If the coating amount is less than 0.05 wt %, a satisfactory oxidation resistance tends to be unable to be obtained. If the coating amount exceeds 0.5 wt %, dispersibility of the phosphor tends to be reduced.

Furthermore, an organic film consisting essentiallly of at least one type of a polymer selected frcm the group consisting of vinyl acetate, polystyrene, polyester, and polyacrylonitrile can be applied as the first layer having an oxidation resistance.

The second layer contains at least one member selected from the group consisting of Zn, Al, and an alkali earth metal and at least one member selected from the group consisting of a colloidal silica, an alumina sol, and a titania sol each of which is commercially available and has a particle size of 50 nm or less. This second layer is assumed to have a structure in which a hydroxide of at least one type of a metal selected from the group consisting of Zn, Al, and an alkali earth metal and, e.g., $SiO_2 \cdot nH_2O$ ($n \geq 0$), $Al_2O_3 \cdot nH_2O$ ($n \geq 0$), or $TiO_2 \cdot nH_2O$ are mixed and adhered on the first layer. The second layer is also assumed to be a silicate or an oxide obtained when these metal ions and, e.g., a colloidal silica are co-precipitated.

In the present invention, therefore, a coating amount of the second layer is represented by a total amount of an amount of the metal ions and an amount of at least one member selected from the group consisting of a colloidal silica, an alumina sol, and a titania sol. This coating amount is adjusted to be preferably 0.008 to 1.5 wt % with respect to the amount of the phosphor. Therefore, an amount of the metal ions is preferably 0.003 to 0.5 wt %, more preferably, 0.01 to 0.1 wt %, and most preferably, 0.03 to 0.08 wt % with respect to the phosphor amount. The amount of at least one member selected from the group consisting of a colloidal silica, an alumina sol, and a titanium sol is preferably 0.005 to 1.0 wt %, more preferably, 0.01 to 0.5 wt %, and most preferably, 0.02 to 0.3 wt % with respect to the phosphor amount. Note that dispersibility tends to be degraded if the total amount of the metal ions and at least one member selected from the group consisting of a colloidal silica, an alumina sol, and a titania sol is less than 0.08 wt % or exceeds 1.5 wt %.

In formation of the second layer, the metal is preferably used in the form of a water-soluble metal compound. Examples of the metal compound are zinc sulfate, zinc nitrate, aluminum sulfate, potassium nitrate, magnesium nitrate, and strontium nitrate.

A colloidal silica, an alumina sol, and a titania sol may be those commercially available having a particle size of 50 nm and may be either anionic or cationic. In addition, the colloidal silica, the alumina sol, and the titania sol can be prepared by using commercially available silica, alumina, and titania fine powders having a particle size of 50 nm or less. A powder selected from these powders is suspended in water in advance, and the pH of the suspension is adjusted to be 10 or more. Thereafter, the resultant suspension is milled into a colloidal or sol material. In this case, the particle size of the colloid or sol particles must be adjusted to be 50 nm or less. If the particle size exceeds 50 nm, dispersibility of the phosphor is degraded.

The second layer can be formed on the phosphor having the first layer thereon by preparing a suspension containing the phosphor and the water-soluble metal compound described above and at least one member selected from the group consisting of a colloidal silica, an alumina sol, and a titania sol as a coating material and adjusting the pH of the suspension. If the water-soluble metal compound is a Zn compound, the pH of the suspension is preferably 7.0 to 7.4. If the compound is an Al compound, the pH is preferably 6.0 to 7.0. If the compound is an alkali earth metal compound, the pH is preferably 10.0 to 10.5. When these compounds are used in the form of a mixture, the pH of the suspension of the mixture is adjusted by using, e.g., ammonia water in accordance with a compound having a highest pH wavelength range.

A phosphor used in the present invention may be any phosphor normally used in a color cathode-ray tube. Examples of the phosphor are a zinc sulfide-based phosphor, a yttrium oxysulfide-based phosphor, a zinc silicate-based phosphor, and a cadmium zinc sulfide-based phosphor. In particular, since the zinc sulfide-based and yttrium oxysulfide-based phosphors increase an oxidation effect of hydrogen peroxide, they can be effectively used in the present invention to obtain an oxidation resistance.

In addition, when a phosphor of the present invention is adhered on a pigment having a color similar to a luminescent color of the phosphor, it can be used as phosphor with a pigment.

The effect of the present invention will be described below with reference to the accompanying drawings.

Figure 1B:
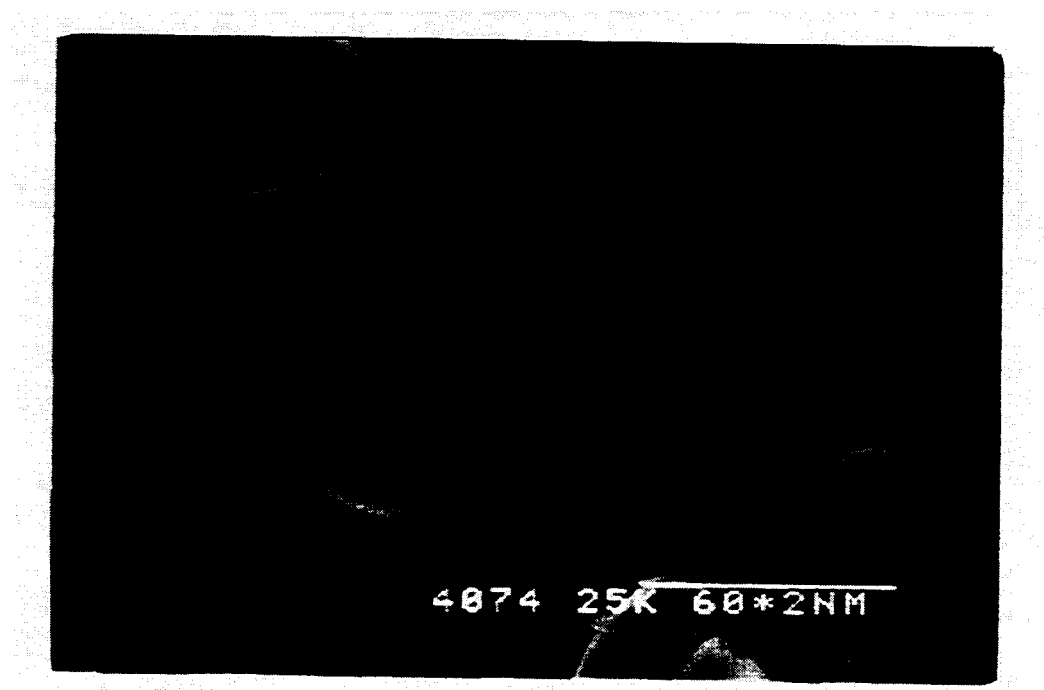
FIG. 1B is a photograph showing a structure of the surface of a particle of a phosphor according to the present invention.

FIG. 1A is a photograph showing a structure of the surface of a conventional oxidation-resistant phosphor particle. As shown in FIG. 1A, this conventional oxidation-resistant phosphor has a structure in which an organic film is formed as a first layer and comparatively large silica particles are adhered at random as a second layer. A phosphor having such a structure has no satisfactory dispersibility. FIG. 1B is a photograph showing a structure of the surface of a phosphor particle according to the present invention. As shown in FIG. 1B, since an organic film having a satisfactory oxidation resistance is formed as a first layer in the phosphor of the present invention. In addition, since a substantially uniform coating layer containing the compound consisting of Zn, Al or Alkali earth metal and fine particles of e.g. colloidal silica having a particle size of 50 nm or less is formed as a second layer, satisfactory flowability can be obtained.

The present invention will be described in more detail below by way of Examples of phosphor which can be used in the present invention.

EXAMPLE 1

1 kg of a blue emission phosphor (ZnS: Ag, Al) having a volume average diameter (Dm) of 7 $\mu$m was suspended in a solution mixture of 3 l of ethanol and 40 ml of 18% ammonia water, and a liquid temperature was increased up to 50° C. to prepare a phosphor suspension.

A solution mixture of 34.7 g of 28.8-wt % ($SiO_2$ content) ethyl silicate and 150 g of ethanol was prepared. At the same time as the solution mixture was gradually dropped in the suspension at a temperature of 50° C., ammonia water was gradually dropped to maintain a pH of the suspension at 9.2 to 9.5, thereby hydrolyzing the ethyl silicate. A silica gel which was precipitated upon hydrolysis was adhered on the surface of the phosphor to gradually form a substantially uniform $SiO_2$ film. After the solution mixture was dropped, the prepared solution was decanted several times to remove the supernatant. Thereafter, the phosphor was separated and dried at 110° C. for 8 hours, thereby obtaining a blue emission phosphor having a substantially uniform $SiO_2$ film as a first layer.

3 l of water were added to the obtained phosphor to disperse it by using a ball mill for one hour, thereby preparing a phosphor dispersion. 5 ml of a 20-weight-/volume(W/V) % water dispersion of an anionic colloidal silica (LUDOX AX available from Du Pont de Nemours, E.I., Co.) having a particle size of about 20 nm and 60 ml of a 1.7-(W/V) % aqueous zinc sulfate solution were added to the resultant dispersion, and ammonia water was added to adjust the pH of the dispersion to be about 7.4. Thereafter, the phosphor was separated from the resultant dispersion and dried at 110° C. for 8 hours, thereby obtaining a phosphor having a second layer containing silica and zinc formed on the first layer. In the obtained phosphor, 1.0 wt % of an $SiO_2$ film was contained with respect to the phosphor amount in the first layer, and 0.04 wt % of Zn and 0.1 wt % of $SiO_2$ were contained in the second layer. Controls 1 & 2

As Control 1, silica particles having a particle size of 80 nm were coated on a blue emission phosphor similar to that used in Example 1 in an amount of 0.4 wt % with respect to the phosphor amount in accordance with a conventional method. In addition, as Control 2, an acrylic resin was coated on a blue emission phosphor similar to that used in Example 1 in an amount of 0.15 wt % with respect to the phosphor amount and silica particles having a particle size of 80 nm were coated on the obtained coating layer in an amount of 0.1 wt % with respect to the phosphor amount in accordance with a conventional method. Oxidation resistances of the obtained phosphors were evaluated as follows. The phosphors of Example 1 and Controls 1 and 2 were dispensed 50 g each and dispersed in three beakers each containing 500 ml of 10% hydrogen peroxide water. Each of the resultant dispersions was kept at a temperature of 60° C. while being stirred by a hot stirrer. Each dispersion was sampled when 10, 20, and 30 minutes elapsed after stirring was started, and powder brightness of the phosphor of each sample was measured. In addition, powder brightness of an original phosphor of each dispersion was measured and was defined as powder brightness at 0 min. FIG. 2 is a graph showing relative brightness with respect to time assuming that the 0-min powder brightness of the phosphor of Control 1 is 100%. As shown in FIG. 2, brightness deterioration over time is large in each of Controls 1 and 2, while that of Example 1 is small. Note that the brightness deterioration after 30 min represented by a brightness reduction rate with respect to the brightness at 0 min is shown in a table.

Dispersibility of each obtained phosphor was measured as follows.

200 ml of a normal cationic photosensitive solution containing a PVA-SBQ-based photosensitive agent and a cationic surfactant and 100 g of each phosphor were mixed in a polyethylene bottle to prepare a photosensitive solution slurry, and the slurry was rolled over night.

Normally, a phosphor exposed to a photosensitive solution for a long time period tends to agglomerate, and a phosphor having poorer dispersibility agglomerate, more easily. Therefore, a volume average particle size (Dm), a screen passing rate, and a sediment volume of the photosensitive solution slurry were measured by using this property, thereby evaluating the dispersibility of the phosphor. The results are summarized in tables.

Measurement of volume average particle size (Dm)

Dms of the three types of phosphors before rolling were equally 7.0 pm. The Dms were measured after rolling and evaluated as follows.

| Dm (μm) | Evaluation |
| --- | --- |
| 7.0 to less than 7.6 | Good |
| 7.6 to less than 8.5 | Fair |
| 8.5 or more | Unsatisfactory |

Measurement of screen passinq rate

A time required for 100 ml of a phosphor after rolling to pass through a screen having a 380 mesh was measured at room temperature and evaluated as follows.
Passing Time (sec)
40 sec or less
more than 40 sec to less than 100 sec
100 sec or more Measurement of sediment volume 15 ml of each photosensitive slurry after rolling were centrifugally separated at 1,000 rpm for 15 minutes, and its sediment volume was measured and evaluated as follows in consideration of inspection precision.
Sediment Volume (ml)
2.5 or less
3.0 or more As shown in the above tables, Example 1 has better dispersibility than those of Controls 1 and 2.

EXAMPLE 2

By using a phosphor suspension similar to that used in Example 1, a first layer was formed on a blue phosphor particle following the same procedures as in Example 1 except that a mixing ratio between 28.8-wt % ($SiO_2$ content) of ethyl silicate and ethanol was changed such that an amount of the first layer was 0.7 wt % with respect to an amount of the phosphor particle.

Subsequently, the obtained phosphor was used to prepare a phosphor dispersion following the same procedures as in Example 1. 3.5 ml of a 20-(W/V) % water dispersion of a cationic alumina sol (ALUMINA SOL 100 available from NISSAN Chemical Co.) having a particle size of 20 nm and 40 ml of a 4-(W/V) % aqueous aluminum sulfate solution were added to the resultant phosphor dispersion, and the pH of the dispersion was adjusted to be 6.5 by using ammonia water and dilute sulfuric acid. Thereafter, a phosphor having a second layer containing alumina and aluminum was prepared from the dispersion following the same procedures as in Example 1. In the obtained phosphor, 0.7 wt % of an $SiO_2$ film with respect to the phosphor amount were contained in the first layer, and 0,025 wt % of Al and 0.07 wt % of alumina were contained in the second layer. The dispersibility and oxidation resistance of the obtained phosphor were measured following the same procedures as in Example 1. The obtained results are summarized in a table.

EXAMPLE 3

500 g of a red emission phosphor ($Y_2O_2S$: Eu, Sm) having a Dm of 7 μm were used to prepare a phosphor suspension following the same procedures as in Example 1. By using this phosphor suspension, a first layer was formed on the red emission phosphor following the same procedures as in Example 1 except that a mixing ratio between 28.8-wt % ($SiO_2$ content) ethyl silicate and ethanol such that an amount of the first layer was 1.5 wt % with respect to the phosphor amount.

Subsequently, the obtained phosphor was used to prepare a phosphor dispersion following the same procedures as in Example 1. 4.0 ml of a 20-(W/V) % water dispersion of a titania fine powder (Titanium Dioxide P25 available from Aerozil Co.) having a particle size of 20 nm into a sol beforehand and 40 ml of a 4-(W/V) % aqueous aluminum sulfate solution were added to the prepared emission phosphor dispersion, and the pH of the dispersion was adjusted to be 6.5 by using ammonia water and dilute suifuric acid. Thereafter, a phosphor having a second layer containing titania and aluminum was obtained from the dispersion following the same procedures as in Example 1. In the obtained phosphor, 1.5 wt % of an $SiO_2$ film were contained with respect to the phosphor amount in the first layer, and 0.05 wt % of Al and 0.16 wt % of titania were contained in the second layer. The dispersibility and oxidation resistance of the obtained phosphor were measured following the same procedures as in Example 1. The results are summarized in a table.

EXAMPLE 4

Following the same procedures as in Example 1, 1.0 wt % of an $SiO_2$ film was coated on 500 g of a blue phosphor similar to that used in Example 1.

This phosphor was dispersed following the same procedures as in Example 1. 2.0 ml of a 10-(W/V) % water dispersion of a cationic colloidal silica (Snowtex BK available from NISSAN Chemical Co.) having a particle size of 20 nm, 2 ml of a 10-(W/V) % water dispersion of an anionic colloidal silica (Snowtex N available from NISSAN Chemical Co.) having a particle size of 80 nm, and 40 ml of a 2-(W/V) % aqueous magnesium sulfate solution were added to the resultant dispersion, and the pH of the dispersion was adjusted to 10.5 following the same procedure as in Example 1, thereby obtaining a phosphor.

Following the same procedures as in Example 1, a phosphor in which 1.0 wt % of an uniform $SiO_2$ film was contained in the first layer and the second layer was obtained by coating a compound containing 0.32 wt % of Mg and 0.08 wt % of $SiO_2$ with respect to the phosphor amount.

The oxidation resistance and dispersibility of the obtained phosphor were evaluated following the same procedures as in Example 1. The results are summarized in a table.

EXAMPLE 5

By using 1 kg of a blue emission phosphor similar to that used in Example 1, 1.0 wt % of $SiO_2$ with respect to the phosphor amount was formed following the same procedures as in Example 1.

Figure 3:
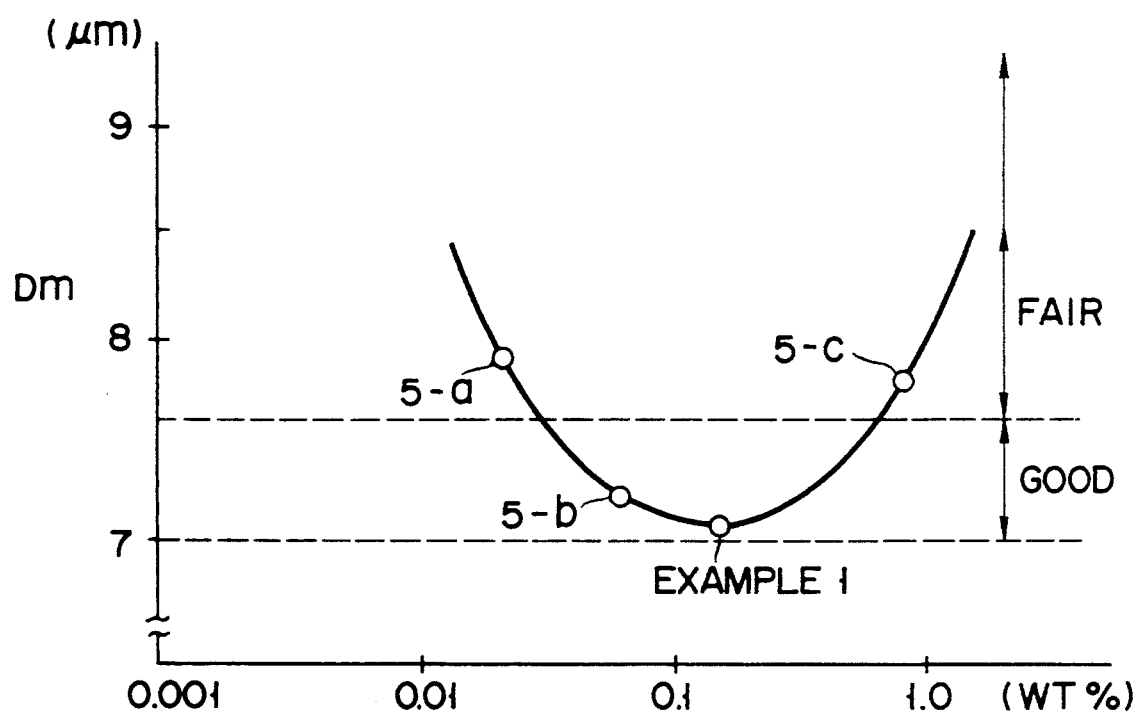
FIG. 3 is a graph showing a relationship between a coating amount of a silicate and dispersibility in a second layer of a phosphor according to the present invention.

Subsequently, the resultant phosphor was dispensed in units of 100 g, and a second layer was formed on each phosphor by changing a mixing ratio between an anionic colloidal silica and zinc sulfate similar to those used in Example 1 as follows. That is, in a phosphor (5-a), 0,005 wt % of Zn and 0.015 wt % of silica with respect to the phosphor amount were contained in the second layer. In a phosphor (5-b), 0.01 wt % of Zn and 0.05 wt % of silica with respect to the phosphor amount were contained in the second layer. In a phosphor (5-c), 0.1 wt % of zn and 0.7 wt % of silica with respect to the phosphor amount were contained in the second layer. Dms of the obtained phosphors were measured following the same procedures as in Example 1. The measurement results together with the result of the phosphor of Example 1 are shown in a graph of FIG. 3 in which the abscissa indicates a total amount of silicate and Zn ion in the second layer and the ordinate indicates the Dm. The results shown in FIG. 3 reveal a tendency of an amount of the compound coated as the second layer of the phosphor of the present invention with respect to the dispersibility.

EXAMPLE 6

1 kg of a blue emission phosphor (ZnS: Ag, Al) having a Dm of 7 μm was suspended in 3 l of water to prepare a water suspension. 10 ml of a 15-(W/V) % aqueous anionic acrylic emulsion solution and 30 ml of a 2-(W/v) % aqueous magnesium nitrate solution as a flocculating agent were added to the resultant suspension, and the pH of the suspension was adjusted to be 10.5 by using ammonia water. The resultant suspension was left to stand to separate the phosphor, and the separated phosphor was dried at 110° C. for 8 hours, thereby obtaining a blue emission phosphor in which the first layer was coated with 0.15 wt % of an acrylic resin with respect to the phosphor amount.

Subsequently, 3 l of water were added to the resultant phosphor and dispersed by using a ball mill for one hour. 5 ml of a 20-(W/V) % water dispersion of an anionic colloidal silica (LUDOX AM available from Du Pont de Nemours, E.I., Co.) having a particle size of 20 nm and 30 ml of a 1.7-(W/V) % aqueous zinc sulfate solution were added to the dispersion, and the pH of the dispersion was adjusted to be 7.4 by using ammonia water. The phosphor was separated from the dispersion and dried at 110° C. for eight hours to obtain a phosphor having a second layer.

In the second layer of the obtained phosphor, 0.02 wt % of zn and 0.1 wt % of $SiO_2$ were contained with respect to the phosphor amount.

Following the same procedures as in Example 1, the phosphor was dispersed in 10% hydrogen peroxide water and sampled 10, 20, and 30 minutes thereafter, and a rate of brightness deterioration as an oxidation resistance was evaluated following the same procedures as in Example 1. The results are summarized in a table.

EXAMPLE 7

After 10 ml of a 20-(W/V) % aqueous anionic acrylic emulsion solution and 50 ml of a 1-(W/V) % weakly acidic aqueous sodium alginate solution were added to 1 kg of a green emission phosphor (ZnS: Cu, Al) having a Dm of 7 μm, the phosphor was separated and dried at 110° C. for 8 hours, thereby forming a phosphor coated with 0.2 wt % of an acrylic resin and 0.05 wt % of alginic acid.

Subsequently, after the phosphor was dispersed following the same procedures as in Example 1, 7.0 ml of a 10-(W/V) % water dispersion of a cationic alumina sol (ALUMINA SOL 100 available from NISSAN Chemical Co.) having a particle size of 20 nm and 20 ml of a 4-(w/v) % aqueous aluminum sulfate solution were added to the resultant dispersion, and the pH of the dispersion was adjusted to be 6.5 by using ammonia water and dilute sulfuric acid.

Thereafter, a phosphor in which a layer containing 0.013 wt % of AZ and 0.07 wt % of alumina with respect to the phosphor amount were obtained following the same procedures as in Example 1.

The oxidation resistance and dispersibility of the phosphor were evaluated following the same procedures as in Example 1, and the results are summarized in a table.

EXAMPLE 8

After 5 ml of a 20-(W/V) % aqueous anionic acrylic emulsion solution, 5 ml of a 5-(W/V) % aqueous gelatin solution, and a 2-(W/V) % aqueous chitosan solution were added to 500 g of a red emission phosphor similar to that used in Example 3, the phosphor was separated and dried at 110° C. for 8 hours, thereby obtaining a phosphor in which a coating layer containing 0.2 wt % of an acrylic resin, 0.05 wt % of gelatin, and 0.004 wt % of chitosan was formed as a first layer.

Subsequently, after the phosphor was dispersed following the same procedures as in Example 1, 4 ml of a 20-(W/V) % water dispersion containing a titania sol prepared by forming a titania fine powder (Titanium Dioxide P25 available from Aerozil Co.) having a particle size of 20 nm into a sol beforehand and 20 ml of a 4-(w/v) % aqueous aluminum sulfate solution were added to the resultant dispersion, and the pH of the dispersion was adjusted to be 6.5 by using ammonia water and dilute sulfuric acid.

Thereafter, a phosphor in which a layer containing 0.025 wt % of Al and 0.16 wt % of titania with respect to the phosphor amount was formed as a second layer was obtained following the same procedures as in Example 1.

The oxidation resistance and dispersibility of the obtained phosphor were evaluated following the same procedures as in Example 1. The results are summarized in a table.

EXAMPLE 9

After 5 ml of a 20-(W/V) % aqueous urea resin emulsion solution and 5 ml of a 5-(W/V) % aqueous gelatin solution were added to 500 g of a blue emission phosphor similar to that used in Example 1, the phosphor was separated following the same procedures as in Example 1 thereby obtaining a phosphor in which a layer containin 0.2 wt % of a urea resin and 0.05 wt % of gelatin was formed as a first layer.

After this phosphor was dispersed following the same procedures as in Example 1, 2 ml of a 10-(W/V) % water dispersion of a cationic colloidal silica (Snowrex BK available from NISSAN Chemical Co.) having a particle size of 20 nm, 2 ml of a 10-(W/V) % water dispersion of an anionic colloidal silica (Snowtex N available from NISSAN Chemical Co.) having a particle size of 100 nm, and 20 ml of a 4-(W/V) % aqueous magnesium sulfate solution were added to the resultant dispersion, and the pH of the dispersion was similarly adjusted to be 10.5.

Thereafter, following the same procedures as in Example 1, a phosphor in which a layer containing 0.032 wt % of Mg and 0.08 wt % of $SiO_2$ was formed as a second layer was obtained.

The oxidation resistance and dispersibility of the obtained phosphor were evaluated following the same procedures as in Example 1. The results are summarized in a table.

EXAMPLE 10

Figure 4:
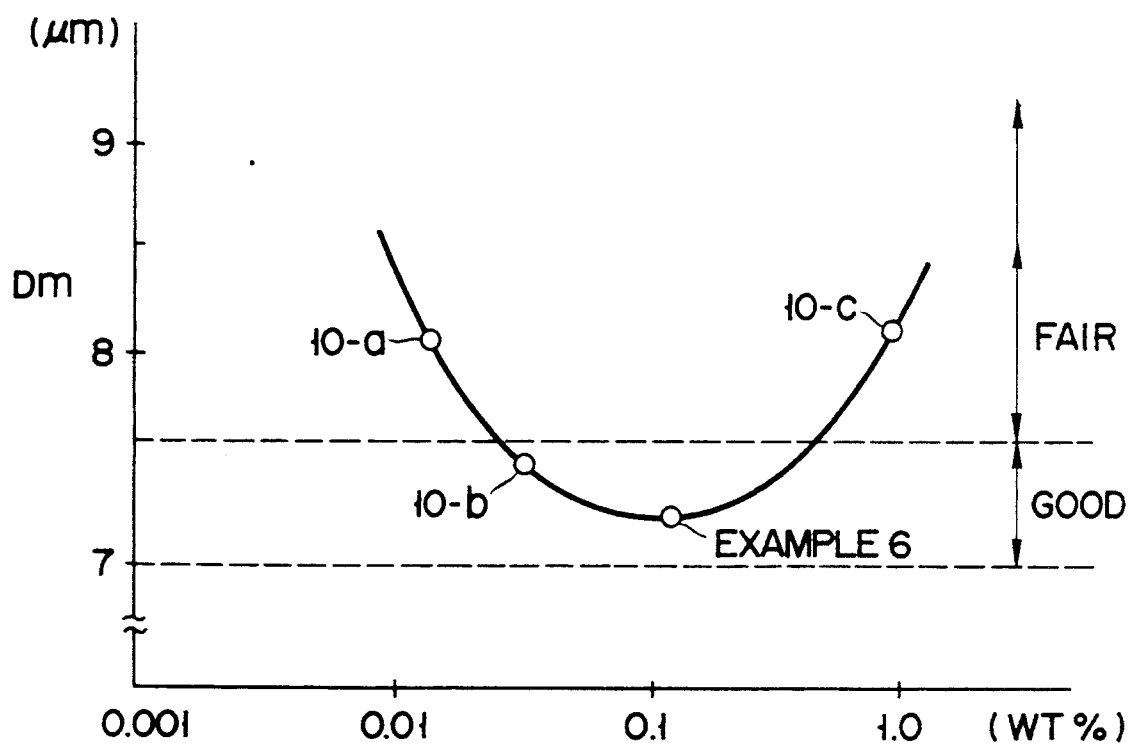
FIG. 4 is a graph showing a relationship between a coating amount of a silicate and dispersibility in a second layer of another phosphor according to the present invention.

A phosphor having a first layer obtained following the same procedures as in Example 6 was dispensed in units of 100 g, and a second layer was formed in each phosphor as follows following the same procedures as in Example 1. That is, in a phosphor (10-a), 0.004 wt % of Zn and 0.01 wt % of $SiO_2$ with respect to the phosphor were contained in the second layer. In a phosphor (10-b), 0.01 wt % of Zn and 0.03 wt % of $SiO_2$ with respect to the phosphor amount were contained in the second layer. In a phosphor (10-c), 0.3 wt % of Zn and 0.7 wt % of $SiO_2$ were contained with respect to the phosphor in the second layer. The dispersibility of each phosphor was measured following the same procedures as in Example 1. The measurement results together with the result of the phosphor of Example 6 are shown in a graph of FIG. 4 in which the abscissa indicates a total amount of silicate and Zn ion in the second layer and the ordinate indicates a Dm. The results shown in FIG. 4 reveal a tendency of an amount of the compound coated as the second layer of the phosphor of the present invention with respect to the dispersibility.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

TABLE

| Phosphor | brightness deterioration (%) | Dispersibility | | |
|---|---|---|---|---|
| | | Dm (μm) | sieve (s) | volume (ml) |
| Example 1 | 3 | 7.1 good | 35 good | 2.1 good |
| Example 2 | 4 | 7.1 good | 30 good | 2.1 good |
| Example 3 | 4 | 7.2 good | 36 good | 2.3 good |
| Example 4 | 4 | 7.2 good | 35 good | 2.2 good |
| Example 6 | 6 | 7.2 good | 38 good | 2.4 good |
| Example 7 | 6 | 7.2 good | 35 good | 2.4 good |
| Example 8 | 7 | 7.4 good | 50 fair | 2.7 good |
| Example 9 | 7 | 7.3 good | 45 fair | 2.6 good |
| control 1 | 20 | 8.8 unsatisfactory | 160 unsatisfactory | 3.5 unsatisfactory |
| control 2 | 7 | 8.5 unsatisfactory | 150 unsatisfactory | 3.4 unsatisfactory |

What is claimed is:

1. A method of manufacturing a cathode ray tube phosphor screen, comprising the steps of:
   selectively forming a first photosensitive layer on the inner surface of a faceplate except the region in which a phosphor layer is to be formed, said first photosensitive layer being removable by a reverse developing agent;

coating the inner surface of a faceplate with a phosphor slurry containing a second photosensitive agent which cannot be removed by the reverse developing agent for said first photosensitive layer;

exposing the inner surface of the faceplate to light emitted from outside and running through the faceplate, and forming a phosphor layer in a region in which a phosphor layer is to be formed on the faceplate and on the first photosensitive layer; and developing the phosphor layer using a reverse developing agent for the first photosensitive layer to remove the first photosensitive layer and phosphor layer formed thereon;

wherein said phosphor comprises:

phosphor particles;

a first layer formed on the surface of each of said phosphor particles in an amount of 0.1 to 5.0% by weight based on the weight of the phosphor particles, and consisting of a substantially uniform silicon dioxide film; and thereover a second layer in an amount of 0.008 to 1.5% by weight based on the weight of the phosphor particles, formed on said first layer and containing at least one metal selected from the group consisting of zinc and aluminum, and an alkali earth metal and at least one member selected from the group consisting of a colloidal silica, an alumina sol, and a titania sol each having a particle size of 50 nm or less.

2. The method according to claim 1, wherein said first layer consists essentially of $SiO_2$ obtained by hydrolysis of an alkyl silicate.

3. The method according to claim 2, wherein said alkyl silicate is at least one member selected from the group consisting of methyl silicate, ethyl silicate, propyl silicate and butyl silicate.

4. The method according to claim 1, wherein said second layer is obtained by applying to said phosphor particles a water-soluble suspension containing a water-soluble metal compound of said metal and at least one member selected from the group consisting of a colloidal silica, an alumina sol, and a titania sol each having a particle size of 50 nm or less.

5. The method according to claim 1, wherein said first photosensitive agent is formed of a second photosensitive composition containing dichromate group, and said second photosensitive agent is formed of a photosensitive composition containing stylbazorium group.

6. The method according to claim 5, wherein said photosensitive composition containing a dichromate group is a polyvinyl alcohol PVA)-ammonium dichromate (ADC) series photosensitive agent, and said photosensitive composition containing stylbazorium group is a polyvinyl alcohol (PVA)-stylbazorium (SBQ) series photosensitive agent.

7. The method according to claim 1, wherein said reversing agent is an oxidizing agent.

8. The method according to claim 7, wherein said oxidizing agent is hydrogen peroxide.

9. The method according to claim 1, wherein said phosphor slurry contains a cationic surfactant.

10. A method of manufacturing a cathode ray tube phosphor screen, comprising the steps of:

selectively forming a first photosensitive layer on the inner surface of a faceplate except the region in which a phosphor layer is to be formed, said first photosensitive layer being removable by a reverse developing agent;

coating the inner surface of a faceplate with a phosphor slurry containing a second photosensitive agent which cannot be removed by the reverse developing agent for said first photosensitive layer;

exposing the inner surface of the faceplate to light emitted from outside and running through the faceplate, and forming a phosphor layer in a region in which a phosphor layer is to be formed on the faceplate and on the first photosensitive layer; and developing the phosphor layer using a reverse developing agent for the first photosensitive layer to remove the first photosensitive layer and phosphor layer formed thereon;

wherein said phosphor comprises:

phosphor particles;

a first layer formed on the surface of each of said phosphor particles in an amount of 0.1 to 5.0% by weight based on the weight of the phosphor particles, and consisting essentially of at least one polymer selected from the group consisting of an acrylic resin, gelatin, alginic acid, chitosan, and a urea resin; and a second layer in an amount of 0.008 to 1.5% by weight based on the weight of the phosphor particles, formed on said first layer and containing at least one metal selected from the group consisting of zinc and aluminum, and an alkali earth metal and at least one member selected from the group consisting of a colloidal silica, an alumina sol, and a titania sol each having a particle size of 50 nm or less.

11. The method according to claim 10, wherein said second layer is obtained by applying a water-soluble suspension containing a water-soluble metal compound of said metal and at least one member selected from the group consisting of a colloidal silica, an alumina sol, and a titania sol each having a particle size of 50 nm or less.

12. The method according to claim 10, wherein said first photosensitive agent is formed of a photosensitive composition containing a dichromate group, and said second photosensitive agent is formed of a photosensitive composition containing stylbazorium group.

13. The method according top claim 12, wherein said photosensitive composition containing dichromate group is a polyvinyl alcohol (PVA)-ammonium dichromate (ADC) series photosensitive agent, and said photosensitive composition containing stylbazorium group is a polyvinyl alcohol (PVA)-stylbazorium (SBQ) series photosensitive agent.

14. The method according to claim 10, wherein said reversing agent is an oxidizing agent.

15. The method according to claim 14, wherein said oxidizing agent is hydrogen peroxide.

16. The method according to claim 10, wherein said phosphor slurry contains a cationic surfactant.

* * * * *